United States Patent Office.

CONSTANTIN FAHLBERG, OF NEW YORK, N. Y., ASSIGNOR OF ONE-HALF TO ADOLPH LIST, OF LEIPSIC, GERMANY.

MANUFACTURE OF SACCHARINE COMPOUNDS.

SPECIFICATION forming part of Letters Patent No. 319,082, dated June 2, 1885.

Application filed August 7, 1884. (Specimens.) Patented in Belgium August 16, 1884, No. 66,048, and in France August 16, 1884, No. 163,797.

*To all whom it may concern:*

Be it known that I, CONSTANTIN FAHLBERG, of the city, county, and State of New York, have invented a new and useful Compound called Saccharine, and Process of Manufacturing the Same, as hereinafter fully described.

My invention relates to the manufacture of a saccharine compound from toluene and other derivatives of coal-tar, which compound contains the elements of carbon, hydrogen, oxygen, sulphur, and nitrogen, and possesses a similar sweet taste as saccharose or cane-sugar. It may be used for many purposes where sugar would be too costly—for instance, in sweetening glucose, grape or starch sugar, and for other purposes where cane-sugar is used for sweetening and preserving purposes.

The invention is based upon the original researches published by myself in the American Chemical Journal, Volume 1, Nos. 2 and 3, June, 1879, pages 170 to 175, and jointly by myself and Ira Remsen, in the same journal, Volume 1, No. 6, pages 426 to 438, in which a saccharine compound was first described, to which the name of "benzoic sulfinide" was given.

The object of this invention is to provide a process by which said saccharine compound can be manufactured on a large scale, and cheap enough to be used in the arts.

The special characteristics of the compound are its sweetness and antiseptic properties.

The high antiseptic properties of my improved saccharine compound will recommend it for many purposes in the arts and medicine. Owing to the fact that it cannot be classed under the heading of nourishments, like sugar and similar carbon hydrates, it may be used for many medical purposes in which cane-sugar is excluded from the diet, as in the case of "diabetes mellitus," and other diseases.

My improved compound does not dissolve easily in cold water. It is more soluble in warm or hot water and can be easily obtained from its aqueous solution in crystalline form. Alcohol and ether dissolve it readily. It crystallizes in thick, short prisms, in all probability belonging to the monoclinic system. The crystals, however, are small and not well formed. It fuses at about 200° centigrade under partial decomposition. Saccharine possesses a marked sweet taste, being much sweeter than cane-sugar and sweeter than grape or starch sugar. A diluted solution of the compound tastes like a saturated solution of cane-sugar.

In an aqueous solution my improved saccharine compound forms readily salt-like compounds with the alkalies, alkaline earths or metals, similar to cane-sugar. These salts possess the same pleasant sweet taste as the compound itself. All salts of the compound crystallize badly, those of the alkalies yielding on evaporation a sirup-like mass, which is unable to crystallize even after long standing.

The saccharine compound forms, under certain conditions, with the residues of the hydrocarbons, as methyl, ethyl, propyl, &c., compounds which are termed "esters," possessing the same sweet properties as the primary compound.

The saccharine compound, being a derivative of benzoic acid, does not ferment, like grape sugar and other carbon hydrates.

Having described so far the properties and advantages of my new sweet compound, to which I have given the name "saccharine," I shall now proceed to describe the process of its preparation.

Operation 1: Saccharine is prepared from coal-tar and similar products, in particular from such products containing abundantly benzine, toluene, xylem, &c. Although toluene generally is used, for economical reasons, other substitution products of benzine and the like, which yield on oxidation or which contain without previous oxidation benzoic acid, may be used. Toluene is first treated with fuming sulphuric acid in the cold, or with concentrated sulphuric acid at a temperature of 220° Fahrenheit, and above, in leaden vessels until it is dissolved, respectively converted into the two isomeric toluene-monosulphonic acids. It has been found, however, that strong concentrated sulphuric acid, or a mixture of hydrated sulphuric acid and anhydrous sulphuric acid, is better adapted for this purpose, inasmuch as the yield of saccharine was larger than when fuming sulphuric acid was used.

Operation 2: As soon as the last trace of toluene has become converted into the two toluene-monosulphonic acids the contents of the vessel are allowed to run into wooden tanks, neutralized with chalk or carbonate of lime, and filtered through a filter-press. The last traces of calcium toluene-sulphonate which persistently adhere to the calcium sulphate in the filter-press are separated from it by washing it with hot water. The wash-liquor is worked together with the first liquor in the next operation.

Operation 3: All liquors of the previous operation are converted from the calcium salt into the salts of the alkalies by means of any of the known carbonates of the alkalies—for instance, into the corresponding sodium toluene-monosulphonates—by using a carbonate or bicarbonate of sodium. The carbonate of lime resulting from this operation can be filtered off by a filter-press and used again in the second operation in place of ordinary chalk. This quantity of carbonate of lime would be sufficient for a continuous preparation of calcium toluene sulphonate had it not been for an excess of sulphuric acid required in operation 1, which is to be neutralized with fresh quantities of chalk.

Operation 4: The resulting solution of the sodium salt is evaporated in open or vacuum pans until on cooling it becomes hard. The contents of the pan are then solidified by running them into iron or wooden molds. The lumps are chipped or broken by hands or machines and placed in a drying-room. To be sure that all the water from the sodium salt is removed, it is dried afterward by steam in convenient drying apparatus.

Operation 5: As soon as the sodium salts are found to be perfectly dry they are treated in an apparatus especially constructed for this purpose, with phosphor-pentachloride (most conveniently made by a method hereinafter described) in proportions to effect a complete transformation. The products formed by this operation will be two isomeric toluene-monosulphochlorides and phosphoroxychloride. The latter is removed by distillation, collected and used in the preparation of phosphor-pentachloride, while the former, consisting of a solid and a liquid toluene sulphochloride, are separated in a centrifugal machine or other equivalent apparatus. A frequent washing with cold water in the centrifugal machine is essential to effect a complete separation of the two toluene sulphochlorides, inasmuch as the saccharine is only obtained from the liquid portion. The solid sulphochloride remaining in the centrifugal machine is removed and converted by a method given below into toluene, hydrochloric, and sulphurous acids. The former is used for the preparation of fresh quantities of toluene-sulphonic acids, the latter for the manufacture of phosphor-pentachlorides or for the separation of saccharine from its salts. The liquid sulphochloride is cooled by ice to separate the last traces of the solid portion, placed again in a centrifugal machine, and finally converted into the amid.

Operation 6: The liquid toluene-sulphochloride is converted either by caustic or carbonate of ammonia, preferably by the latter, into toluene-sulphamid. For this purpose the liquid sulphochloride and the solid carbonate of ammonia are mixed together in proper proportions and exposed to heat, so as to effect the transformation, during which carbonic-acid gas is given off. The remaining mass contains the amid with a certain quantity of ammonium chloride.

Operation 7: The amid, after being separated by a centrifugal machine, is oxidized by means of any of the known oxidizing agents in an alkaline solution, and yields a salt of saccharine, which corresponds with regard to its base to the base of the oxidizing agent. Such oxidizing agents are numerous; but preferably permanganates and plumbic dioxide are used.

In making use of the permanganates the result of the oxidation will be a salt of saccharine, hydrated manganese dioxide, and a free alkali or a carbonate of an alkali. The insoluble hydrated manganese dioxide can be easily separated from the alkaline solution containing the salt of saccharine by means of a filter or any other convenient method, and converted by any of the known methods into permanganates and used for subsequent oxidation of toluene-sulphamid. The slightly alkaline solution containing the salt of saccharine can be neutralized by an acid, and finally evaporated to any desired consistency. The slightly impure product will be found to possess a pleasant sweetness. In order to prepare the pure saccharine therefrom, the concentrated solution of the salt is treated with either hydrochloric or sulphuric acid and the precipitate dissolved and crystallized. It yields in this way a colorless and finely-crystallized product of characteristic sweetness. The precipitation with strong acids is connected with great loss, caused by the decomposition of saccharine in the presence of strong mineral acids. A better method to obtain saccharine in larger quantities and of higher purity consists in the employment of plumbic dioxide as an oxidizing agent. The plumbic dioxide can be easily obtained from either sulphate of lead or basic chloride of lead by oxydation with hypochlorite and carbonate of sodium. Having prepared in such a way the plumbic dioxide it is washed and then ready for use. Toluene sulphamid and plumbic dioxide are mixed together with sufficient water and heated by steam until the toluene sulphamid has become completely converted into the lead salt of saccharine while the plumbic dioxide is converted into litharge. The solution containing the lead-salt is treated with hydrogen sulphide in order to precipitate the lead as lead sulphide. The hot saturated solution of saccharine is then separated from the precipitate by means of any convenient filter, and yields on cooling crystals of pure saccharine. The mother-liquors resulting from the crystallization are used for the oxidation of toluene sulphamid in place of water to save the expense of evaporation, which in the case of the permanganate process would becomparatively large. The lead sulphide and the litharge are made use of in the preparation of fresh quantities of plumbic dioxide. The former is roasted for this purpose in a furnace and converted into sulphate of lead. The latter, however, is treated with chloride of sodium and converted into basic chloride of lead, which latter yields by oxidation with hypochlorite and carbonate of sodium plumbic dioxide, as hereinbefore described.

From the pure saccharine different salts can be prepared by treatment with the corresponding carbonates in an aqueous solution. Saccharine may also be prepared by oxidizing the two toluene-sulphonic acids or their salts with any of the above-named oxidizing agents into sulphobenzoates, and further treatment with phosphor-pentachloride and caustic or carbonate of ammonia. The final result of such a treatment will be the formation of an insoluble diamid of sulphobenzoic acid and the ammonium salt of saccharine.

The way in which saccharine in its pure state is obtained from its salts has already been described.

The phosphoroxychloride, resulting from the fifth operation, contains nearly three-fifths part of the total chlorine and all the phosphorus of the phosphor-pentachloride, and is used in the manufacture of phosphor-pentachloride from phosphorus and bleaching-powder (hypochloride of calcium) by conversion with water into hydrochloric and phosphoric acids. The hydrochloric and phosphoric acids are used for generating chlorine from bleaching-powder. The phosphate of lime and calcium chloride left in the generator may be separated and the phosphate of lime used as a fertilizer. In other respects the old and well-known process of making phosphor-pentachloride from phosphorus is not altered. The solid toluene-sulphochloride, amounting, by weight, to about two-thirds of the total bulk of the toluene sulphochlorides, is mixed with carbon and moistened with water and converted under pressure in a retort into hydrochloric and toluene-sulphonic acids. On passing superheated steam over this mass toluene and hydrochloric and sulphurous acids are obtained. Toluene is used in operation 1, while hydrochloric and sulphurous acids are profitably employed in the separation of saccharine from its salts when the permanganate process of oxidation is used.

The final product of the process described is the new saccharine compound benzoic sulphinide, the chemical formula of which is $C_7H_5O_3SN$, and which has the characteristic properties described in the publications hereinbefore set forth.

Having thus described my invention, I claim as new and desire to secure by Letters Patent—

1. The process of making a new sweet compound from toluene and other derivatives of coal-tar, which consists of the following successive steps: first, converting toluene and the substitution products of benzine and its homologues into toluene-monosulphonic acids by fuming or concentrated sulphuric acid; second, converting the toluene-monosulphonic acids into calcium toluene-monosulphonates by chalk or carbonate of lime; third, converting the calcium toluene monosulphonates by sodium carbonate or bicarbonate or any carbonate of the alkalies into sodium toluene-monosulphonate or any toluene monosulphonate of the alkalies; fourth, evaporating the sodium toluene-monosulphonate in open or vacuum pans, and cooling and drying the same; fifth, converting the dry product into the two isomeric toluene-monosulphochlorides and phosphoroxychloride by the action of phosphor-pentachloride and separation of the resulting solid toluene-monosulphochloride in a centrifugal machine; sixth, converting the liquid toluene-monosulphochloride into the corresponding amid by treatment with caustic or carbonate of ammonia; seventh, treating the amid thus obtained with certain oxidizing agents in an alkaline solution to obtain the salts of the same; and, eighth, separating the pure saccharine compound from its salts by acids, acid salts, and hydrogen sulphide, substantially as described.

2. The process of making a new sweet compound from toluene and other derivatives of coal-tar, which consists in converting toluene into toluene-sulphonic acid, oxidizing said acid or its salts into sulphobenzoic acid or its salts, then evaporating the latter and treating it with phosphor-pentachloride and caustic or carbonate of ammonia, and finally separating the pure saccharine from the ammonium salt thus obtained, substantially as set forth.

3. The regeneration of toluene and the generation at the same time of hydrochloric and sulphurous acids from the solid toluene-monosulphochloride by the action of carbon, water, and superheated steam under pressure, substantially as described.

4. The generation of chlorine for the preparation of phosphor-pentachloride from phosphoroxychloride, bleaching-powder (hypochlorite of lime) and water, respectively, hydrochloric and phosphoric acids, or one of them, substantially as set forth.

5. The saccharine compound, benzoic sulphinide, made by the process herein described.

6. The new saccharine compound, toluene-monosulphamid having the characteristics described.

In testimony whereof I have signed my name to this specification in the presence of two subscribing witnesses.

CONSTANTIN FAHLBERG.

Witnesses:
  G. DITTMER,
  B. ROI.